United States Patent [19]

Reisser et al.

[11] Patent Number: 5,332,767
[45] Date of Patent: Jul. 26, 1994

[54] SYNTHETIC RESIN-COATED METAL PIGMENT, PROCESS FOR THE PRODUCTION THEREOF AND USE THEREOF

[75] Inventors: Wolfgang Reisser, Schnaittach; Guenter Sommer, Lauf, both of Fed. Rep. of Germany

[73] Assignee: Eckart-Werke Standard Bronzpulver-Werke Carl Eckart GmbH & Co., Fuerth, Fed. Rep. of Germany

[21] Appl. No.: 647,511

[22] Filed: Jan. 25, 1991

[30] Foreign Application Priority Data

Sep. 28, 1990 [DE] Fed. Rep. of Germany ....... 4030727

[51] Int. Cl.$^5$ .......................... C08K 5/54; C09C 1/62; C09C 1/64; C09C 3/12
[52] U.S. Cl. ................................. 523/209; 523/201; 523/206; 523/202; 428/403; 428/407; 524/262; 524/264; 524/414
[58] Field of Search ............... 523/201, 206, 209, 202; 428/407, 403; 524/262, 264, 414

[56] References Cited

U.S. PATENT DOCUMENTS

| | | | |
|---|---|---|---|
| 4,039,463 | 8/1977 | De Roo et al. | 428/407 |
| 4,315,959 | 2/1982 | Brandts Buys et al. | 523/201 |
| 4,409,342 | 10/1983 | Ancker et al. | 523/302 |
| 4,465,755 | 8/1984 | Kiritani et al. | 428/407 |
| 4,617,327 | 10/1986 | Podszun | 523/206 |
| 4,639,402 | 1/1987 | Mishra et al. | 430/58 |
| 4,690,959 | 9/1987 | Plueddemann | 523/202 |
| 4,818,614 | 4/1989 | Fukui et al. | 428/407 |
| 5,037,475 | 8/1991 | Chida et al. | 428/403 |

FOREIGN PATENT DOCUMENTS

| | | | |
|---|---|---|---|
| 0142784 | 5/1985 | European Pat. Off. | C09D 3/10 |
| 0206140 | 12/1986 | European Pat. Off. | C09C 1/62 |
| 0263428 | 4/1988 | European Pat. Off. | C09D 3/82 |
| 3630356 | 3/1987 | Fed. Rep. of Germany | C09C 1/62 |

OTHER PUBLICATIONS

Patent Abstracts of Japan, vol. 13, No. 3 (C-557) (3351), Jan. 6, 1989.

*Primary Examiner*—Paul R. Michl
*Assistant Examiner*—Andrew E. C. Merriam
*Attorney, Agent, or Firm*—Jones, Day, Reavis and Pogue

[57] ABSTRACT

A synthetic resin-coated metal pigment such as aluminum pigment has a siloxane coating covalently bonded to the surface of the pigment particles, and a three-dimensionally cross-linked synthetic resin coating covalently bonded to the siloxane coating. Production of the coated pigment comprises production of a silicon-organic coating on the pigment surface and then conversion of that coating into a siloxane coating by hydrolysis and condensation, followed by reaction with a low-molecular compound for forming the cross-linked synthetic resin coating. A range of uses of the coated pigment is also set forth.

29 Claims, No Drawings

SYNTHETIC RESIN-COATED METAL PIGMENT, PROCESS FOR THE PRODUCTION THEREOF AND USE THEREOF

BACKGROUND OF THE INVENTION

The invention generally concerns synthetic resin-coated metal pigments, a process for the production thereof and uses thereof.

Aqueous or water-based painting and printing ink systems are steadily gaining in importance due to the increasing emphasis which is being put on environmental protection. Such systems cannot use metal pigments with a reactive surface, or they can use such pigments only to a limited extent because the surface alters chemically with the passage of time, and that generally results in an adverse effect on the visual properties of the metal pigment particles, such as shine and brilliance. That applies in particular in regard to aluminum pigments which react in contact with water, with the formation of hydrogen, in particular in acid or alkaline media. However aqueous coating compositions which are of a basic nature frequently involve an alkaline environment for the metal pigment particles therein.

A number of proposals have been put forward for the purposes of stabilising the surface of metal pigments, in particular aluminum-based metal pigments, to resist the attack of chemicals and water, in particular in order to permit such pigments to be used in aqueous paint, lacquer and ink compositions which contain a binding agent. A basic proposal along those lines is concerned with inhibiting the reaction with water by the adsorption of corrosion inhibitors on the pigment surfaces. Suitable inhibitors for that purpose are special borates, phosphates, vanadates, organic phosphoric acid compounds (esters) and certain fatty acids in monomer or polymer (oligomer) form, for example dimeric acid.

However it is not possible in that way to achieve passivation which is sufficient in particular to permit the metal pigments to be used in aqueous compositions, quite apart from the fact that the visual properties of the pigments are severely impaired by the treatment with such corrosion inhibitors.

An effective passivating treatment of aluminum pigments is described in German laid-open application (DE-OS) No 36 36 183. In that procedure, chromic acid acts on the pigment surface in such a fashion as to provide for a high level of gassing stability, even in the presence of water, while retaining the good visual properties of the metal powder. As a result aluminum pigments when treated with chromic acid in that way are suitable for the production of high-grade coating compositions such as paints or lacquers, printing inks and other coating agents, which are stable in terms of storage. However the use of toxic chromic acid gives rise to various ecological problems. Furthermore, the content of chromium compounds in the pigments is undesirable in many cases.

Another line of thrust of proposals for reducing the level of reactivity of aluminum pigments is directed to coating the pigments with protective synthetic resin coatings. A requirement for effective stabilisation of the pigments in relation to chemical and thus also physical changes is a closed and strongly adhering coating on the pigment surface. Adhesion of that nature can only be achieved when the organic material is chemically bonded, also referred to as chemisorption, to the pigment particles by means of pigment-affinitive bonding or adsorption groups, for example carboxylate or phosphate groups.

For that purpose, EP-Al 0 170 474 and 0 319 971 propose a pigment coating with phosphoric acid-modified resins. Another procedure along those lines is also the two-stage process to be found in German laid-open application (DE-OS) No 36 30 356 in which the pigments are first coated with an ethylenically unsaturated carboxylic acid acting as a bonding agent and/or an ethylenically unsaturated phosphoric acid mono- or diester, whereupon a synthetic resin coating with a three-dimensional structure is formed by the addition of a monomer with at least three ethylenic double bonds, by radical polymerisation. That coating procedure in which the resins adhere to the pigment surface by way of carboxylate and/or phosphate groups admittedly results in aluminum pigments which have sufficient gassing stability in water for many purposes, but in regard to aqueous paint or lacquer and printing ink systems which are often basic the level of gassing stability is unsatisfactory because the carboxylate or phosphate adsorption groups in such systems are not sufficiently stable in regard to hydrolysis so that the synthetic resin coating at least partially detaches from the pigment surface after a relatively short storage time.

U.S. Pat. No. 4,213,886 describes the production of a synthetic resin-coated alum/hum pigment in which an acrylate resin which forms the outer coating, being based on an alkyl acrylate or alkyl methacrylate, is bonded to the pigment surface by way of silane groups. In that procedure, firstly an ethylenically unsaturated silane is adsorbed on the pigment, whereupon the double bonds in the silane are radically polymerised with an acrylic monomer to provide an acrylate coating. However even pigments when coated by means of that process cannot be used to produce aqueous paint or varnish or printing ink systems which have sufficient storage stability. Apart from the fact that, with those pigments, the adhesion of the synthetic resin coating on the pigment, which is afforded by the silane treatment, is unsatisfactory, the structure of the acrylate coating also appears to be insufficiently resistant to the penetration of water and chemicals. Admittedly, the above-indicated U.S. patent specification discloses that a hydrolysable group is to be connected to the silicon atom of the silane and that there is a relationship between hydrolysis of the silanes and the pH-value of the silane solution, but the specification does not give specific instructions for specific performance of the hydrolysis operation.

SUMMARY OF THE INVENTION

An object of the present invention is to provide a synthetic resin-coated metal pigment which affords a comparatively high level of resistance to water and chemicals.

Another object of the present invention is to provide a synthetic resin-coated metal pigment in which the bonding effect between the surface of the metal particles and the synthetic resin coating is produced by way of a silicon-organic compound.

Still another object of the present invention is to provide a synthetic resin-coated metal pigment which affords improved adhesion of the synthetic resin coating to the pigment and a sealing structure in respect of the synthetic resin coating to provide a high level of chemical resistance, whereby it is suitable for the production of aqueous metal coating agents which enjoy storage stability.

Still a further object of the present invention is to provide a process for the production of a synthetic resin-coated metal pigment which provides for good adhesion of the synthetic resin coating to the pigment particles by a simple operating procedure.

In accordance with the principles of the present invention the foregoing and other objects are attained by a synthetic resin-coated metal pigment such as an aluminum pigment wherein the surface of the pigment particles is provided with siloxane coating which is covalently bonded thereto and to which a three-dimensionally cross-linked synthetic resin coating is covalently bonded.

In a further aspect of the invention, the foregoing and other objects are attained by a process for the production of a metal pigment as set forth above, wherein the surface of the pigment particles is treated in a first stage with a silicon-organic compound (silane derivative) which can be reacted to provide a siloxane and which contains at least one organic reactive grouping, thereupon in a second stage the silicon-organic coating on the pigment particles is converted into a siloxane coating using a hydrolysis catalyst and with the addition of water by hydrolysis and subsequent condensation, and the siloxane coating is reacted in a further stage with at least one low-molecular compound which can be reacted with said reactive grouping, under conditions such that a three-dimensionally cross-linked synthetic resin coating is formed.

It has been found that particularly good adhesion of the synthetic resin coating to the pigment particles is achieved when the hydrolysis and condensation operations in respect of the silane compound which is used in the first stage and which is adsorbed on the pigment surface to provide the siloxane coating is effected quantitatively as far as possible. Conversion of the silane into the siloxane is therefore preferably carried out with an amount of water which at least corresponds to the amount which is required stoichiometrically for complete conversion of that kind. The hydrolysis catalyst used is preferably a compound selected from the group consisting of phosphonic acids and phosphoric acids, for example 2-carboxyethane phosphonic acid, 2-aminoethane phosphonic acid and octane phosphonic acid. That involves the additional advantage that the phosphoric and phosphonic acids not only act as a catalyst but are also in a position to provide for additional stabilisation of the aluminum surface if the siloxane coating should have flaws. However, the hydrolysis catalyst used may also be acids or bases such as for example acetic acid or triethylamine.

It will be noted at this point that when reference is made to the use of a hydrolysis catalyst, in connection with the process according to the invention, that also includes the situation where the siliconorganic compound used for coating of the pigment surface has a grouping which is effective as a hydrolysis catalyst in regard to conversion into the siloxane coating so that there is no need for the separate addition of such a catalyst. Thus, autocatalytic conversion to siloxanes occurs when using amino-functional silanes with water.

In regard to the metal pigment produced, in a preferred feature, the amount of silicon-organic compound used for coating of the metal particles is at least such that a monomolecular layer can be formed on the particles. In that connection the size and shape of the metal particles is to be taken into account, generally being in the form of scales or flakes.

The appended claims of this specification set forth in general terms some silicon-organic compounds which are used by way of example or by way of preference in carrying the invention into effect. The following may be mentioned in that respect as specific silicon-organic compounds, but without limitation thereto:

3-Aminopropyl-trimethoxysilane, N-methyl-3-aminopropyltrimethoxysilane, 3-aminopropyl-triethoxysilane, 3-aminopropyl-tris (2-methoxy-epoxy-ethoxysilane), N-aminoethyl-3-aminopropyltrimethoxysilane, 3-methacryloxypropyl-trimethoxysilane, 3-acryloxypropyl-trimethoxysilane, 3-glycidyloxypropyl-trimethoxysilane, 3-mercaptopropyl-trimethoxysilane, 3-mercaptopropyl-triethoxysilane, 3-mercaptopropyl-methyldimethoxysilane, vinyltrichlorsilane, vinyltrimethoxysilane, vinyltriethoxysilane, and vinyl-tris (2-methoxyethoxy) silane. Those silanes may be used alone or in combination.

The silicon-organic compounds which are used in accordance with the invention and also the siloxanes produced therefrom by hydrolysis and condensation have reactive groups which can be reacted with low-molecular compounds acting as what are referred to as cross-linkers, under such conditions that a three-dimensionally cross-linked synthetic resin coating is formed. That involves covalent bonding of the synthetic resin coating to the siloxane coating which acts as a bonding agent or kind of primer. In accordance with a preferred feature, the low-molecular compounds which can be reacted with the siloxane coating are those which have at least three functional groups in relation to polymerisation, polycondensation or polyaddition; they are preferably ethylenic double bonds as occur for example in allyl groups.

The following table sets out examples of combinations which can be used in accordance with the principles according to the invention of reactive groupings on the organic residue of the silicon-organic compounds used, and functional groupings on the low-molecular compounds or cross-linkers which are reacted with the siloxane coating.

| Reactive grouping on the organic residue of the silicon-organic compound | Functional groupings on the low-molecular compound |
| --- | --- |
| amino | epoxy, isocyanate phenol |
| epoxy | amine |
| acryl, methacryl, vinyl | acryl, methacryl, vinyl, allyl |
| mercapto | olefin, isocyanate, epoxy |

The following are mentioned as low-molecular compounds or crosslinkers which are preferred in the invention:

Trimethylolpropanetrimethacrylate, trimethylolpropanetriacrylate, tetramethylolmethanetriacrylate, tetramethylolmethanetetraacrylate and oligomeric polyallylglycidylether.

Preferably, aluminum pigments with a particularly high level of stability in relation to water and chemicals are achieved if the pigment surface is first coated with an acryl-, methacryl- or vinyl-functional siloxane layer which is then provided with the synthetic resin coating in a radical polymerisation operation by the addition of a radical starter and a compound which contains at least three reactive acrylic, methacrylic, vinyl or allyl groups. In that respect, depending on the nature and number of the reactive groupings of the siloxane coating, the cross-linking may also extend into same.

The radical starters which can be used in accordance with the invention include the peroxides and azo compounds which are known for that purpose, for example 2,2-azobis (2-methylpropanenitrile).

A test which is used to check the stability under conditions which approach those of a practical situation, in respect of the aluminum pigments which are coated in accordance with the invention, in terms of resistance to water and chemicals, is known as a 'boiling test'. In that test, 1.5 g of aluminum paste is pre-dispersed in 10 g of butyl glycol and then poured into a gas-tightly closable apparatus, with 150 g of boiling water. As a measurement in respect of the level of stability, a measurement is taken in respect of the time in which 400 ml of hydrogen is developed by reaction of the aluminum pigment with the water. While conventional, that is to say non-stabilised aluminum pigments finish reacting in that test in a few minutes, the pigments coated in accordance with the invention attain boiling test times of more than 10 hours.

By virtue of the compatibility of the resin coating of the pigments according to the invention with other synthetic resins and by virtue of the electrically insulating properties of their resin coating, the pigments according to the invention are also highly suitable for coloration of plastic materials or for use in wet and powder lacquers for electrostatic lacquering. If the pigment preparation is in paste form and is to be used for the production of powder lacquers and paints, it will be appreciated that the organic solvent or water contained in the paste must first be removed by drying.

Further objects, features and advantages of the present invention will become more clearly apparent from the examples described hereinafter.

EXAMPLE 1

190 g of an aluminum pigment paste with a metal content of 65% and mean particle size of 18 μn (known as Stapa Metallux 8154 from the company Eckart-Werke) is dispersed in 600 g of test benzine * and heated to 120° C. 3.8 g of 3-methacryloxypropyl-trimethoxysilane in 10 g of test benzine is first added, followed then by 0.15 g of vinyl phosphonic acid in 10 g of mineral spirit, 0.15 g of water and 2.5 g of 2-butanol, and stirring is effected for a further 1 hour at a temperature of 120° C. Then, firstly 6 g of trimethylolpropanetrimethacrylate in 10 g of mineral spirit is added, and then over a period of 30 minutes a suspension of 0.2 g of 2,2-azobis (2-methylpropanenitrile) in 5 g of test benzine is introduced. Stirring is then effected for a further 5 hours at a temperature of 120° C. and then the reaction mixture is left to cool down for a period of 2 hours, while being stirred. The coated pigment is separated from the reaction mixture by means of a suction filter and adjusted to a solids content of about 70%. By the addition of test benzine, a pigment paste with 65% of solid material is produced, which in the above-mentioned boiling test attains a time of more than 24 hours.

* (=white spirit)

EXAMPLE 2

128 g of the aluminum pigment paste used in Example 1 is dispersed in 520 g of test benzine and heated to a temperature of 120° C. 2.5 g of 3-methacryloxypropyl-trimethoxysilane in 10 g of test benzine is added, followed then by the addition of 0.1 g octanephosphonic acid in 10 g of test benzine, 0.1 g of water and 3.5 g of 2-butanol, and stirring is then effected for a period of 1 hour at 120° C. Then, 4.7 g of trimethylolpropanetrimethacrylate in 10 g of test benzine is first added, and then over a period of 30 minutes a suspension of 1.0 g of 2.2-azobis ( 2-methylpropanenitrile ) in 5 g of test benzine is introduced. The reaction mixture is then stirred for a further 5 hours at a temperature of 120° C. and then left to cool down for a period of 2 hours, while being stirred. The coated pigment is separated from the reaction solution by means of a suction filter and brought to a solids content of about 70%. The addition of test benzine results in a pigment paste with a 65% solid material component, which reaches a time of more than 20 hours in the above-mentioned boiling test.

EXAMPLE 3

Using the mode of operation set forth in Example 2, a coated aluminum pigment paste is produced using 0.1 g of 2 - carboxyethanephosphonic acid instead of 0.1 g of octanephosphonic acid. In the boiling test the pigment paste reaches a time of mere than 21 hours.

EXAMPLE 4

Using the mode of operation described in Example 2, a coated aluminum pigment paste is produced using 0.1 g of 2-aminoethanephosphonic acid instead of octanephosphonic acid. In the boiling test the pigment paste reaches a time of more than 21 hours.

EXAMPLE 5

Using the mode of operation described in Example 2, a coated aluminum pigment paste is produced using 0.1 g of vinyl phosphonic acid instead of octanephosphonic acid and 4.7 g of trimethylolpropanetriacrylate instead of trimethylolpropanetrimethacrylate. In the boiling test the pigment paste reaches a time of more than 19 hours.

EXAMPLE 6

128 g of the aluminum pigment paste used in Example 1 is dispersed in 520 g of test benzine and heated to a temperature of 120° C. 2.5 g of 3-methacryloxypropyl-trimethoxysilane in 10 g of test benzine is first added, followed then by the introduction of 0.1 g of vinylphosphonic acid in 10 g of test benzine, 0.1 g of water and 2.5 g of 2-butanol, and stirring is then effected for a further 1 hour at a temperature of 120° C. Then, 10 g of trimethylolpropanetrimethacrylate in 10 g of test benzine is added, and then over a period of 30 minutes a suspension of 1.0 g of 2,2-azobis (2-methylpropanenitrile) in 5 g of test benzine is introduced. The reaction mixture is then stirred for a further 5 hours at 120 ° C. and then left to cool down for a period of 2 hours, while being stirred. The coated pigment is separated from the reaction solution by means of a suction filter and brought to a solids content of about 70%. By the addition of test benzine, a pigment paste with a solids content of 65% is produced, which in the boiling test reaches a time of more than 20 hours.

EXAMPLE 7

Using the mode of operation described in Example 6, a coated aluminum pigment paste is produced using 10 g of a commercially available polyallylglycidylether (XI 100 from Monsanto) instead of 10 g of trimethylolpropane-trimethacrylate. The pigment paste reaches a time of more than 10 hours in the boiling test.

It will be appreciated that the above Examples have been set forth solely by way of illustration of the principles of the present invention and that various modifications and alterations may be made without thereby departing from the spirit and scope of the invention.

What is claimed is:

1. A synthetic resin-coated pigment of non-oxidized elemental metal having a protective sealing structure, comprising
    a siloxane coating covalently bonded to the surface of said elemental metal pigment particles, the siloxane coating having a minimum thickness which corresponds to a monomolecular covering on the surface of said elemental pigment particles, said siloxane coating being formed from a silane derivative silicon-organic compound having at least one organic reactive group selected from the group consisting of amino, epoxy, acryl, methacryl, vinyl and mercapto, and
    a three dimensionally cross-linked synthetic resin coating covalently bonded to the siloxane coating, said synthetic resin comprising reaction product of at least one low molecular weight, cross-likable compound, containing functional groups selected from the group consisting of epoxy, isocyanate, phenol, amine, acryl, methacryl, vinyl, allyl, olefin and isocyanate, reacted with said siloxane coating,
    wherein said silicon-organic compound organic reactive group is
        amino, when said low molecular weight compound functional groups are selected from the group consisting of epoxy, isocyanate and phenol;
        epoxy, when said low molecular weight compound functional groups are amine;
        mercapto, when said low molecular weight compound functional groups are selected from the group consisting of epoxy, isocyanate and olefin; or
        is a reactive group selected from the group consisting of acryl, methacryl and vinyl, when said low molecular weight compound functional groups are selected from the group consisting of acryl, methacryl, vinyl and allyl.

2. A synthetic resin-coated pigment of non-oxidized elemental metal having a protective sealing structure, comprising
    a siloxane coating covalently bonded to the surface of said elemental metal pigment particles, the siloxane coating having a minimum thickness which corresponds to a monomolecular covering on the surface of said elemental metal pigment particles, said siloxane coating being formed from a silane-derivative silicon-organic compound having at least one organic reactive group selected from the group consisting of amino, epoxy, acryl, methacryl, vinyl and mercapto, and
    a three-dimensionally cross-linked synthetic resin coating covalently bonded to the siloxane coating, said synthetic resin comprising reaction product of at least one low molecular weight, cross-linkable compound, containing functional groups selected from the group consisting of epoxy, isocyanate, phenol, amine, acryl, methacryl, vinyl, allyl, olefin and isocyanate, reacted with said siloxane coating,
    wherein said silicon-organic compound organic reactive group is
        amino, when said low molecular weight compound functional groups are selected from the group consisting of epoxy, isocyanate and phenol;
        epoxy, when said low molecular weight compound functional groups are amine;
        mercapto, when said low molecular weight compound functional groups are selected from the group consisting of epoxy, isocyanate and olefin; or
        is a reactive group selected from the group consisting of acryl, methacryl and vinyl, when said low molecular weight compound functional groups are selected from the group consisting of acryl, methacryl, vinyl and allyl,
    said elemental metal pigment comprising 85% by weight or greater of said synthetic resin coated elemental metal pigment.

3. A synthetic resin-coated non-oxidized elemental metal pigment comprised of aluminum particles, having
    a protective sealing structure comprising a siloxane coating covalently bonded to the surface of said aluminum particles, the siloxane coating having a minimum thickness which corresponds to a monomolecular covering on the surface of said aluminum particles, said siloxane coating being formed from a silane-derivative silicon-organic compound having at least one organic reactive group selected from the group consisting of amino, epoxy, acryl, methacryl, vinyl and mercapto, and
    a three-dimensionally cross-linked synthetic resin coating covalently bonded to the siloxane coating, said synthetic resin comprising reaction product of at least one low molecular weight, cross-linkable compound, containing functional groups selected from the group consisting of epoxy, isocyanate, phenol, amine, acryl, methacryl, vinyl, allyl, olefin and isocyanate, reacted with said siloxane coating,
    wherein said silicon-organic compound organic reactive group is
        amino, when said low molecular weight compound functional groups are selected from the group consisting of epoxy, isocyanate and phenol;
        epoxy, when said low molecular weight compound functional groups are amine;
        mercapto, when said low molecular weight compound functional groups are selected from the group consisting of epoxy, isocyanate and olefin; or
        is a reactive group, selected from the group consisting of acryl, methacryl and vinyl, when said low molecular weight compound functional groups are selected from the group consisting of acryl, methacryl, vinyl and allyl,
    said aluminum pigment comprising 85% by weight or greater of said synthetic resin coated elemental metal pigment.

4. A water-based coating comprising
    a synthetic resin-coated elemental metal pigment having a siloxane coating covalently bonded to the surface of the metal pigment particles, the siloxane coating having a minimum thickness which corresponds to a monomolecular covering on the surface of the metal pigment particles, said siloxane coating being formed from a silane-derivative siliconorganic compound having at least one organic reactive group selected from the group consisting of amino, epoxy, acryl, methacryl, vinyl and mercapto, and a three-dimensionally cross-linked synthetic resin coating covalently bonded to the siloxane coating, said synthetic resin comprising reaction product of at least one low molecular weight, cross-linkable compound, containing functional groups selected from the group consisting of epoxy, isocyanate, phenol, amine, acryl, methacryl, vinyl, allyl, olefin and isocyanate, reacted with said siloxane coating, wherein said silicon-organic compound organic reactive group is amino, when said low molecular weight compound functional groups are selected from the group consisting of epoxy, isocyanate and phenol;

epoxy, when said low molecular weight compound functional groups are amine;

mercapto, when said low molecular weight compound functional groups are selected from the group consisting of epoxy, isocyanate and olefin; or is a reactive group selected from the group consisting of acryl, methacryl and vinyl, when said low molecular weight compound functional groups are selected from the group consisting of acryl, methacryl, vinyl and allyl.

5. A water-based ink comprising a synthetic resin-coated elemental metal pigment having a siloxane coating covalently bonded to the surface of the metal pigment particles, the siloxane coating having a minimum thickness which corresponds to a monomolecular covering on the surface of the metal pigment particles, said siloxane coating being formed from a silane-derivative silicon-organic compound having at least one organic reactive group selected from the group consisting of amino, epoxy, acryl, methacryl, vinyl and mercapto, and a three-dimensionally cross-linked synthetic resin coating covalently bonded to the siloxane coating, said synthetic resin comprising reaction product of at least one low molecular weight, cross-linkable compound, containing functional groups selected from the group consisting of epoxy, isocyanate, phenol, amine, acryl, methacryl, vinyl, allyl, olefin and isocyanate, reacted with said siloxane coating, wherein said silane-organic compound organic reactive group is amino, when said low molecular weight compound functional groups are selected from the group consisting of epoxy, isocyanate and phenol;

epoxy, when said low molecular weight compound functional groups are amine;

mercapto, when said low molecular weight compound functional groups are selected from the group consisting of epoxy, isocyanate and olefin; or is a reactive group selected from the group consisting of acryl, methacryl and vinyl, when said low molecular weight compound functional groups are selected from the group consisting of acryl, methacryl, vinyl and allyl.

6. A wet-lacquer for electrostatic lacquering comprising a synthetic resin-coated elemental metal pigment having a siloxane coating covalently bonded to the surface of the metal pigment particles, the siloxane coating having a minimum thickness which corresponds to a monomolecular covering on the surface of the metal pigment particles, said siloxane coating being formed from a silane-derivative siliconorganic compound having at least one organic reactive group selected from the group consisting of amino, epoxy, acryl, methacryl, vinyl and mercapto, and a three-dimensionally cross-linked synthetic resin coating covalently bonded to the siloxane coating, said synthetic resin comprising reaction product of at least one low molecular weight, cross-linkable compound, containing functional groups selected from the group consisting of epoxy, isocyanate, phenol, amine, acryl, methacryl, vinyl, allyl, olefin and isocyanate, reacted with said siloxane coating, wherein said silane-organic compound organic reactive group is amino, when said low molecular weight compound functional groups are selected from the group consisting of epoxy, isocyanate and phenol;

epoxy, when said low molecular weight compound functional groups are amine;

mercapto, when said low molecular weight compound functional groups are selected from the group consisting of epoxy, isocyanate an olefin; or is a reactive group selected from the group consisting of acryl, methacryl and vinyl, when said low molecular weight compound functional groups are selected from the group consisting of acryl, methacryl, vinyl and allyl.

7. A powder lacquer for electrostatic lacquering comprising a synthetic resin-coated elemental metal pigment having a siloxane coating covalently bonded to the surface of the metal pigment particles, the siloxane coating having a minimum thickness which corresponds to a monomolecular covering on the surface of the metal pigment particles, said siloxane coating being formed from a silane-derivative silicon-organic compound having at least one organic reactive group selected from the group consisting of amino, epoxy, acryl, methacryl, vinyl and mercapto, and a three-dimensionally cross-linked synthetic resin coating covalently bonded to the siloxane coating, said synthetic resin comprising reaction product of at least one low molecular weight, cross-linkable compound, containing functional groups selected from the group consisting of epoxy, isocyanate, phenol, amine, acryl, methacryl, vinyl, allyl, olefin and isocyanate, reacted with said siloxane coating, wherein said silane-organic compound organic reactive group is amino, when said low molecular weight compound functional groups are selected from the group consisting of epoxy, isocyanate and phenol;

epoxy, when said low molecular weight compound functional groups are amine;

mercapto, when said low molecular weight compound functional groups are selected from the group consisting of epoxy, isocyanate and olefin; or is a reactive group selected from the group consisting of acryl, methacryl and vinyl, when said low molecular weight compound functional groups are selected from the group consisting of acryl, methacryl, vinyl and allyl.

8. A non-oxidized, elemental metal pigment as set forth in claim 1 wherein the synthetic resin coating is produced from at least one low-molecular compound having at least three functional groupings for an operation selected from polymerization, polyaddition and polycondensation.

9. A non-oxidized, elemental metal pigment as set forth in claim 8 wherein the covalent bonding of the synthetic resin coating to the siloxane coating is produced by reaction of at least one organic reactive residue of the siloxane molecules with said at least one low-molecular compound.

10. A non-oxidized, elemental metal pigment as set forth in claim 9 wherein said organic residue has at least one group which is reactive for an operation selected from polymerization, polyaddition and polycondensation.

11. A non-oxidized, elemental metal pigment as set forth in claim 1 wherein said metal is aluminum.

12. A plastic material including a non-oxidized, elemental metal pigment as set forth in claim 1 for coloring thereof.

13. A process for the production of a synthetic resin-coated metal pigment wherein the surface of the pigment particles is treated with a silicon-organic compound which can be reacted to provide a siloxane and which contains at least one organic reactive grouping; the silicon-organic coating on the pigment particles is converted using a hydrolysis catalyst selected from the group consisting of phosphonic acids and phosphoric acids and with the addition of water by hydrolysis and subsequent condensation into a siloxane coating; and the siloxane coating is reacted with at least one low-molecular compound which is reactable with said reactive grouping, under such conditions that a three-dimensionally cross-linked synthetic resin coating is formed.

14. A process as set forth in claim 13 wherein the hydrolysis catalyst further stabilizes the metal pigment surface in areas of siloxane coating flaws.

15. The product of any of claims 1-8 and 10-13 wherein said low molecular weight cross-linkable compound is selected from the group consisting of
trimethylol propane trimethyacrylate, trimethylol propane triacylate, tetra methylol methane triacrylate, tetra methylol methane tetra acrylate, oligomeric polyallyl glycidyl ether, and mixtures thereof.

16. A process as set forth in claim 13 wherein thee mount of silicon-organic compound used is such, having regard to the shape and size of the pigment particles, that at least a monomolecular coating is formed on the pigment surface.

17. A process as set forth in claim 13 wherein the hydrolysis operation is carried out with an amount of water corresponding to the amount which is stoichiometrically required for complete conversion of the silicon-organic coating into the siloxane coating.

18. A process as set forth in claim 13 wherein the hydrolysis catalyst used is a compound selected from the group consisting of 2-carboxyethane phosphonic acid, 2-aminoethane phosphonic ac and octane phosphonic acid.

19. A process as set forth in claim 13 wherein the reactive grouping of the silicon-organic compound is reacted with said at least one low-molecular compound for forming the synthetic resin coating by an operation selected from polymerisation, polyaddition and polycondensation.

20. A process as set forth in claim 13 wherein a low-molecular compound which has at least three functional groupings for an operation selected from polymerisation, polyaddition and polycondensation is used for the reaction with the reactive grouping of the silicon-organic compound.

21. A process as set forth in claim 20 wherein the low-molecular compound has at least three ethylenic double bonds.

22. A process as set forth in claim 21 wherein the ethylenic double bonds are formed by at least one of acrylic and methacrylic groups.

23. A process as set forth in claim 21 wherein the ethylenic double bonds are formed by allyl groups.

24. A process as set forth in claim 13 wherein the silicon-organic compound used is of the formula $R_{4-n}SiX_n$ wherein n represents 2 or 3, R represents an organic residue with the reactive grouping and X represents a hydrolysable substituent.

25. A process as set forth in claim 24 wherein X alternatively represents a hydrolysable grouping.

26. A process as set forth in claim 24 wherein the organic residue R includes at least one of the following: an ethylenic double bond, an amino, mercapto, epoxy, hydroxyl and isocyanate group.

27. A process as set forth in claim 26 wherein the organic residue includes at least one of an acrylic and methacrylic group.

28. A process as set forth in claim 24 wherein X represents one of Cl—, $CH_3O$—, $C_2H_5O$—, $CH_3COO$—, $CH_3O(C_2H_4O)_2$—and $CH_3OC_2H_4O$—.

29. A process as set forth in claim 21 wherein the low-molecular compound is selected from the following group: trimethylolpropane trimethacrylate, trimethylolpropane triacrylate, tetramethylolmethane triacrylate, tetramethylolmethanetetraacrylate and polyallylglycidylether.

* * * * *